3,096,343
METHOD FOR ISOLATING AROMATIC CARBOXYLIC ACIDS
Ovell Francis Bennett, Woodbury, N.J., assignor to E. I. du Pont de Nemours and Company, Wilmington, Del., a corporation of Delaware
No Drawing. Filed July 20, 1960, Ser. No. 44,017
13 Claims. (Cl. 260—328)

The isolation of aromatic carboxylic acids has long been a problem in the art. Generally, the preparation of such acids results in the formation of by-products from which the desired acids must be separated. Unfortunately, however, many aromatic carboxylic acids have solubilities in common solvents differing only slightly from those of the by-products so that isolation of the desired acids by solvent extraction is very difficult, and, because of their high boiling points and tendency to char at elevated temperatures, fractional distillation procedures are not feasible.

It is, therefore, an object of the present invention to provide a simple and economic method for the isolation of aromatic carboxylic acids. More specifically, the present inventon relates to a simple and economic method for the isolation of aromatic carboxylic acids having an ionization constant in water greater than $1.5 \times 10^{-4}$ from mixtures containing such acids.

I have found that the foregoing object can be achieved through the formation and separation of solid adducts or addition compounds of N,N-dimethylformamide (hereafter abbreviated DMF) and the desired acid, followed by volatilization of the DMF. In accordance with my invention, a mixture containing the desired acid is dissolved in hot DMF, the solution is cooled to precipitate the adduct formed between DMF and the acid, the adduct is separated from the remaining solution by known methods, e.g., filtration, centrifugation, etc., and the solid adduct is heated to drive off the DMF and recover the acid.

The critical feature of this invention resides in the discovery that the formation of these stable adducts is dependent upon the strength of the acid. Acids having an ionization constant of or less than $1.5 \times 10^{-4}$ do not form isolable adducts with DMF, whereas aromatic acids having an ionization constant greater than $1.5 \times 10^{-4}$ do. For example, terephthalic acid and isophthalic acid have ionization constants equal to and less than $1.5 \times 10^{-4}$, respectively, and do not form isolable adducts with DMF. Therefore, they cannot be isolated according to my process. Thus, the aromatic carboxylic acids which may be isolated in accordance with my invention are those having an ionization constant in water greater than $1.5 \times 10^{-4}$. Adducts of these acids with DMF have a limited solubility in DMF at room temperature or below. The ionization constants used in this description are those measured at 24° C.

While adduct formation between the DMF and the aromatic acid will occur over a wide temperature range, I prefer to dissolve the mixture containing the aromatic acid in DMF at or near the boiling point of the DMF and to prepare a concentrated solution at this temperature in order to provide a maximum recovery of the adduct when the solution is cooled. Accordingly, the amount of DMF used will be that which will completely dissolve the desired acid at about the boiling point of DMF, e.g., at approximately 153° C. It is within the scope of this invention to raise the temperature at which DMF boils by the use of pressure in order to increase the solubilizing efficiency of the DMF.

Regeneration of the acid is achieved by thermal decomposition of the solid adduct. The adduct is heated to a temperature sufficient to drive off the DMF, and a residue of the desired acid is produced. Because the strength of the bond formed between the acid and DMF varies with each acid, it is obvious that the temperature required to remove the DMF varies according to the acid. In general, temperatures between 150 and 200° C. are sufficient. These temperatures are lower than the boiling point and the decomposition point of the free acid. The DMF may be collected and used again.

In order to more adequately describe the present invention, reference is now made to the following examples which are cited by way of illustration, and should not be considered as limiting. Parts in the examples are parts by weight.

*Example 1*

A gray, impure sample of pyromellitic acid (1 part) was dissolved in 5.7 parts of hot DMF. The hot solution was slurried with charcoal, and filtered until free of solids. The DMF solution was cooled causing precipitation of a white solid which was separated from the liquid phase by suction-filtration and air-dried. Infrared analysis of the product showed the 3 bands characteristic of DMF adduct formation, e.g., a broad band between 3.9 and $4.3\mu$, a medium sharp band between 5.1 and $5.3\mu$, and a relatively sharp band between 6.1 and $6.3\mu$. The adduct was composed of 1 mole of pyromellitic acid and 3 moles of DMF as determined by the neutralization equivalent which was 121. Calculated was 119. A weighed sample of this adduct was heated between 150 and 170° C. in a high-temperature oven for several hours and gave a quantitative loss of DMF. The residue, pyromellitic acid, was pure as determined by infrared analysis; the infrared spectrum was identical to that of an authentic sample of pyromellitic acid. Pyromellitic acid has an ionization constant in water of $1.2 \times 10^{-2}$.

*Example 2*

Two parts of a slightly-gray, impure sample of trimellitic acid was dissolved in 9.5 parts of hot DMF and treated in the same manner as in Example 1. A white solid was obtained. Infrared analysis of the solid showed the presence of the 3 bands characteristic of DMF adduct formation. The adduct was composed of 1 mole of trimellitic acid and 1 mole of DMF as determined by the neutralization equivalent which was 98.3. Calculated was 94.3. A weighed sample of this adduct was heated at approximately 150° C. for several hours and gave a quantitative loss of DMF. The residue, trimellitic acid, was pure as determined by infrared analysis. The infrared spectrum of the residue was identical to that of an authentic sample of trimellitic acid. Trimellitic acid has an ionization constant in water of $3.0 \times 10^{-3}$.

*Example 3*

A solution of 5 parts of gray, impure trimellitic anhydride in 9.5 parts of hot DMF was treated in the same manner as in Example 1 and a white solid was obtained. Obviously, the ionization constant of the anhydride in water is identical to that of the corresponding trimellitic acid. The infrared spectrum of the solid showed the presence of the 3 bands characteristic of DMF adducts. The adduct was composed of 1 mole of trimellitic anhydride and 1 mole of DMF as determined by the neutralization equivalent which was 88. Calculated was 88. A weighed sample of this adduct was heated at about 150° C. for several hours and gave a quantitative loss of DMF. The residue was pure trimellitic anhydride as determined by infrared analysis, which showed an infrared spectrum identical to that of an authentic sample of trimellitic anhydride.

In addition to the DMF adducts prepared in the foregoing examples, it is within the scope of my invention to prepare adducts formed between DMF and numerous other aromatic acids. They can be aromatic monocarboxylic or polycarboxylic acids. They can be polyaromatic carboxylic acids in which the ring linkage is direct or indirect, for instance, through a sulfonyl linkage, as illustrated by the following example.

*Example 4*

A white solid was obtained when 5 parts of a yellow, impure sample of bis(4-carboxyphenyl) sulfone was dissolved in 19 parts of hot DMF and treated in the same manner as in Example 1. Infrared analysis of the solid showed the presence of the sulfonyl linkage and the 3 bands characteristic of DMF adduct formation. The adduct was composed of 1 mole of bis(4-carboxyphenyl) sulfone and 1 mole of DMF as determined by the neutralization equivalent which was 189.5. Calculated was 189.5. A weighed sample of this adduct was heated at about 150–170° C. for several hours to drive off the DMF. The residue was shown to be bis(4-carboxyphenyl) sulfone by infrared analysis which gave an infrared spectrum identical to that of an authentic sample. Bis(4-carboxyphenyl) sulfone has an ionization constant in water greater than $1.5 \times 10^{-4}$.

In addition, the polyaromatic carboxylic acids can be linked through more than one group to form a closed ring structure, as illustrated by the following example.

*Example 5*

A light-tan solid was obtained when 5 parts of a black, impure sample of 2,6-anthraquinonedicarboxylic acid was dissolved in 95 parts of hot DMF and treated in the same manner as in Example 1. Infrared analysis of the solid showed the presence of the bridge carbonyl and the 3 bands characteristic of DMF adduct formation. The adduct was composed of 1 mole of 2,6-anthraquinonedicarboxylic acid and 2 moles of DMF as determined by the neutralization equivalent which was 215. Calculated was 221. A weighed sample of this adduct was heated for several hours at about 190° C. to drive off the DMF. The residue, 2,6-anthraquinonedicarboxylic acid, was pure as determined by infrared and elemental analyses. The infrared spectrum of the residue was identical to that of an authentic sample of 2,6-anthraquinonedicarboxylic acid. 2,6-anthraquinonedicarboxylic acid has an ionization constant in water greater than $1.5 \times 10^{-4}$.

*Example 6*

When 10 parts of a black, impure sample of 2,7-dicarboxythiaxanthone-5,5-dioxide was dissolved in 95 parts of hot DMF and treated in the same manner as in Example 1, a light-tan solid was obtained. Infrared analysis of the solid showed the presence of the carbonyl linkage, the sulfonyl linkage, and the 3 bands characteristic of DMF adduct formation. The neutralization equivalent of the adduct was found to be 239 and agreed with that calculated for the adduct composed of 1 mole of 2,7-dicarboxythiaxanthone-5,5-dioxide and 2 moles of DMF. Calculated was 239. After a weighed sample of the adduct was heated for several hours at approximately 170° C. to give a quantitative loss of DMF, a light-tan residue was obtained. The infrared spectrum of the residue was identical to that of an authentic sample of 2,7-dicarboxythiaxanthone-5,5-dioxide. In addition, the residue was shown to be 2,7-dicarboxythiaxanthone-5,5-dioxide by elemental analysis and neutralization equivalent. The neutralization equivalent was 167. Calculated was 166. 2,7-dicarboxythiaxanthone-5,5-dioxide has an ionization constant in water greater than $1.5 \times 10^{-4}$.

Thus, there are many aromatic acids that can be isolated according to this process. However, it is a critical feature that the aromatic carboxylic acid to be isolated has an ionization constant in water greater than $1.5 \times 10^{-4}$. For instance, terephthalic acid, which has an ionization constant in water of $1.5 \times 10^{-4}$, did not form an adduct when an impure sample was dissolved in hot DMF and treated in the same manner as in Example 1 to precipitate a white solid. Infrared analysis of the solid indicated that no adduct formation was present. Instead, the solid was shown to be terephthalic acid as determined by infrared analysis which gave an infrared spectrum identical to that of an authentic sample of terephthalic acid.

If it is desirable to isolate an acid having an ionization constant in water greater than $1.5 \times 10^{-4}$ from mixtures containing other carboxylic acids, obviously the acids other than that desired must have ionization constants less than $1.5 \times 10^{-4}$, and they must not precipitate from solution simultaneously with the adduct formed between DMF and the desired acid.

The invention has been described in detail in the foregoing. However, it will be obvious to those skilled in the art that many variations are possible without departure from the scope of the invention. I intend, therefore, to be limited only by the following claims.

I claim:
1. A method for the isolation of an aromatic carboxylic acid selected from the group consisting of pyromellitic acid, trimellitic acid, bis(4-carboxyphenyl)-sulfone, 2,6-anthraquinonedicarboxylic acid and 2,7-dicarboxythiaxanthone-5,5-dioxide which comprises dissolving a mixture containing the acid to be isolated in hot N,N-dimethylformamide, cooling the solution thus formed to precipitate an adduct of N,N-dimethylformamide and said acid, separating the adduct from the remaining solution, and heating the adduct to drive off the N,N-dimethylformamide.

2. A process according to claim 1, wherein the aromatic carboxylic acid is pyromellitic acid.

3. A process according to claim 1, wherein the aromatic carboxylic acid is trimellitic acid.

4. A process according to claim 1, wherein the aromatic carboxylic acid is bis(4-carboxyphenyl) sulfone.

5. A process according to claim 1, wherein the aromatic carboxylic acid is 2,6-anthraquinonedicarboxylic acid.

6. A process according to claim 1, wherein the aromatic carboxylic acid is 2,7-dicarboxythiaxanthone-5,5-dioxide.

7. A method for the isolation of an aromatic carboxylic acid selected from the group consisting of pyromellitic acid, trimellitic acid, bis(4-carboxyphenyl)-sulfone, 2,6-anthraquinonedicarboxylic acid and 2,7-dicarboxythiaxanthone-5,5-dioxide which comprises dissolving a mixture containing the acid to be isolated in hot N,N-dimethylformamide, treating the hot solution thus formed with charcoal to further purify the said acid, separating the charcoal from the hot solution, cooling the solution to precipitate an adduct of N,N-dimethylformamide and said acid, separating the adduct from the remaining solution, and heating the adduct to drive off the N,N-dimethylformamide.

8. An addition compound of N,N-dimethylformamide and an aromatic carboxylic acid selected from the group consisting of pyromellitic acid, trimellitic acid, bis(4-carboxyphenyl)-sulfone, 2,6-anthraquinonedicarboxylic acid and 2,7-dicarboxythiaxanthone-5,5-dioxide.

9. The addition compound of N,N-dimethylformamide and pyromellitic acid.

10. The addition compound of N,N-dimethylformamide and trimellitic acid.

11. The addition compound of N,N-dimethylformamide and bis(4-carboxyphenyl) sulfone.

12. The addition compound of N,N-dimethylformamide and 2,6-anthraquinonedicarboxylic acid.

13. The addition compound of N,N-dimethylformamide and 2,7-dicarboxythiaxanthone-5,5-dioxide.

References Cited in the file of this patent

UNITED STATES PATENTS

| 2,756,252 | McKinnis | July 24, 1956 |
| 2,794,831 | McKinnis | June 4, 1957 |

OTHER REFERENCES

Audrieth et al., Non-Aqueous Solvents, John Wiley and Sons, Inc. (1956), page 146.